US012440770B2

(12) United States Patent
Wang et al.

(10) Patent No.: US 12,440,770 B2
(45) Date of Patent: Oct. 14, 2025

(54) VIRTUAL ORGANIZATION CREATION METHOD AND APPARATUS, STORAGE MEDIUM, AND ELECTRONIC DEVICE

(71) Applicant: Tencent Technology (Shenzhen) Company Limited, Shenzhen (CN)

(72) Inventors: Xinfeng Wang, Shenzhen (CN); Peiyuan Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 356 days.

(21) Appl. No.: 18/144,051

(22) Filed: May 5, 2023

(65) Prior Publication Data

US 2023/0271090 A1 Aug. 31, 2023

Related U.S. Application Data

(63) Continuation of application No. PCT/CN2022/117162, filed on Sep. 6, 2022.

(30) Foreign Application Priority Data

Sep. 17, 2021 (CN) ......................... 202111095561.0
Dec. 30, 2021 (CN) ......................... 202111670466.9

(51) Int. Cl.
*A63F 13/795* (2014.01)
*A63F 13/352* (2014.01)
*A63F 13/85* (2014.01)

(52) U.S. Cl.
CPC .......... *A63F 13/795* (2014.09); *A63F 13/352* (2014.09); *A63F 13/85* (2014.09)

(58) Field of Classification Search
CPC ...... A63F 13/795; A63F 13/352; A63F 13/85; A63F 13/77; A63F 13/79; A63F 13/60; A63F 13/533; A63F 13/63; A63F 13/69
(Continued)

(56) References Cited

U.S. PATENT DOCUMENTS

2007/0173323 A1 7/2007 Johnson et al.
2018/0375822 A1 12/2018 Dahlberg et al.
(Continued)

FOREIGN PATENT DOCUMENTS

CN 101123591 A 2/2008
CN 101467449 A 6/2009
(Continued)

OTHER PUBLICATIONS

Tencent Technology, WO, PCT/CN2022/117162, Nov. 30, 2022, 5 pgs.
(Continued)

*Primary Examiner* — Michael A Cuff
(74) *Attorney, Agent, or Firm* — Morgan, Lewis & Bockius LLP

(57) ABSTRACT

This application discloses a method for creating a virtual organization in a target game application performed by an electronic device. The method includes: acquiring an organization identifier of a target virtual organization to be created by a first game account; determining, in a preset virtual region set, a target virtual region matching a first IP address used by the first game account to log into the target game application, which is a virtual region to which a country or an administrative region in which the first IP address is located is mapped; creating the target virtual organization located in the target virtual region in response to a creation instruction triggered by the first game account; and displaying the organization identifier of the target virtual organization and attribute information of the target virtual region, including a language used by a game account in the virtual organization created in the target virtual region.

20 Claims, 11 Drawing Sheets

(58) Field of Classification Search
USPC .............................................................. 463/42
See application file for complete search history.

(56) References Cited

U.S. PATENT DOCUMENTS

| | | | | |
|---|---|---|---|---|
| 2022/0126202 | A1* | 4/2022 | Zhang | H04L 67/145 |
| 2022/0207485 | A1* | 6/2022 | Hansen | G06Q 10/1053 |
| 2022/0280866 | A1* | 9/2022 | Yanai | A63F 13/73 |

FOREIGN PATENT DOCUMENTS

| | | | | | |
|---|---|---|---|---|---|
| CN | 105187469 | A | | 12/2015 | |
| CN | 107812382 | A | * | 3/2018 | G09B 19/00 |
| CN | 113730921 | A | | 12/2021 | |
| CN | 114367112 | A | | 4/2022 | |
| JP | 2020110674 | A | | 7/2020 | |
| KR | 20120139262 | A | | 12/2012 | |
| KR | 20130116231 | A | | 10/2013 | |
| KR | 101772436 | B1 | | 8/2017 | |

OTHER PUBLICATIONS

Tencent Technology, IPRP, PCT/CN2022/117162, Mar. 5, 2024, 6 pgs.
Tencent Technology, ISR, PCT/CN2022/117162, Nov. 30, 2022, 2 pgs.
Tencent Technology, Korean Office Action, KR Patent Application No. 10-2023-7038082, May 9, 2025, 20 pgs.

* cited by examiner

VIRTUAL ORGANIZATION CREATION METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2022/117162, entitled "VIRTUAL ORGANIZATION CREATION METHOD AND APPARATUS, STORAGE MEDIUM, AND ELECTRONIC DEVICE" filed on Sep. 6, 2022, which claims priority to Chinese Patent Application No. 202111670466.9, entitled "VIRTUAL ORGANIZATION CREATION METHOD AND APPARATUS, STORAGE MEDIUM, AND ELECTRONIC DEVICE" filed with the China National Intellectual attribute Administration on Dec. 30, 2021, and Chinese Patent Application No. 202111095561.0, entitled "VIRTUAL ORGANIZATION CREATION METHOD AND APPARATUS, STORAGE MEDIUM, AND ELECTRONIC DEVICE" filed with the China National Intellectual attribute Administration on Sep. 17, 2021, all of which are incorporated herein by reference in their entireties.

FIELD OF THE TECHNOLOGY

This application relates to the computer field, and in particular, to a virtual organization creation method and apparatus, a storage medium, and an electronic device.

BACKGROUND OF THE DISCLOSURE

In a related virtual game world, an organizational group of game players is referred to as a virtual organization. Players in a virtual organization of players can interact with each other, and can also team up to play a game.

Currently, a virtual organization is created based on actual geographical locations of players. Usually, after a player logs in to a game client, an actual geographical location of the player is identified through a positioning system on a user terminal used by the player. The player may create a virtual organization corresponding to the actual geographical location of the player. When a location of a user terminal used by another player is also the actual geographical location, the another player can join the virtual organization corresponding to the actual geographical location. For example, an actual geographical location of a player A that is identified based on a terminal used by the player A is Beijing, a game client creates a correspondence between Beijing and a virtual organization created by the player A. When an actual geographical location identified based on a terminal used by a player B is also Beijing, the player B can join the virtual organization created by the player A.

SUMMARY

According to an embodiment of this application, a method for creating a virtual organization in a target game application is performed by an electronic device, the method including: acquiring an instruction for creating a target virtual organization, the instruction including an organization identifier of the target virtual organization corresponding to a first game account; determining, in a preset virtual region set, a target virtual region matching a first IP address used by the first game account to log into the target game application, the target virtual region being a virtual region to which a country or an administrative region in which the first IP address is located is mapped; creating the target virtual organization located in the target virtual region; and displaying the organization identifier of the target virtual organization and attribute information of the target virtual region, the attribute information comprising a language used by a game account in the virtual organization created in the target virtual region.

According to an embodiment of this application, a non-transitory computer-readable storage medium is further provided, the computer-readable storage medium storing a computer program that, when executed by a processor of a computer device, causes the electronic device to perform the virtual organization creation method when being run.

According to an embodiment of this application, an electronic device is further provided, including a memory and a processor, the memory storing a computer program that, when executed by the processor, causes the electronic device to perform the virtual organization creation method through the computer program.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings.

DESCRIPTION OF EMBODIMENTS

To make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In the specification, claims, and the foregoing accompanying drawings of this application, the terms “first”, “second”, and so on are intended to distinguish between similar objects rather than indicating a specific order. It is to be understood that such used data is interchangeable where appropriate so that the embodiments of this application described here can be implemented in an order other than those illustrated or described herein. In addition, the terms “include”, “have”, and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Related abbreviations and key terms in this application are defined as follows:

Virtual organization: an organizational group of users in a virtual world. In some games, a virtual organization particularly refers to a game association.

Game association: a player interaction group established within a game.

Game association member: different players within a same game association.

Virtual region: geographical regions with similar cultures and languages across countries.

Preferred combat server: IDC for short, a combat server that a player preferentially connects to during real-time combat entertainment in a game.

Central domain: central for short, a maximum flow range of game data. Game data across central domains is isolated from each other.

Physical positioning: calling a GPS module of a mobile phone to obtain a current physical location of a device.

Login location: an IP address used by a player to connect to a lobby server. The login location is a virtual location. The virtual location can reflect a physical location of a player to some extent when the player does not intentionally modify the virtual location.

Figure 1:
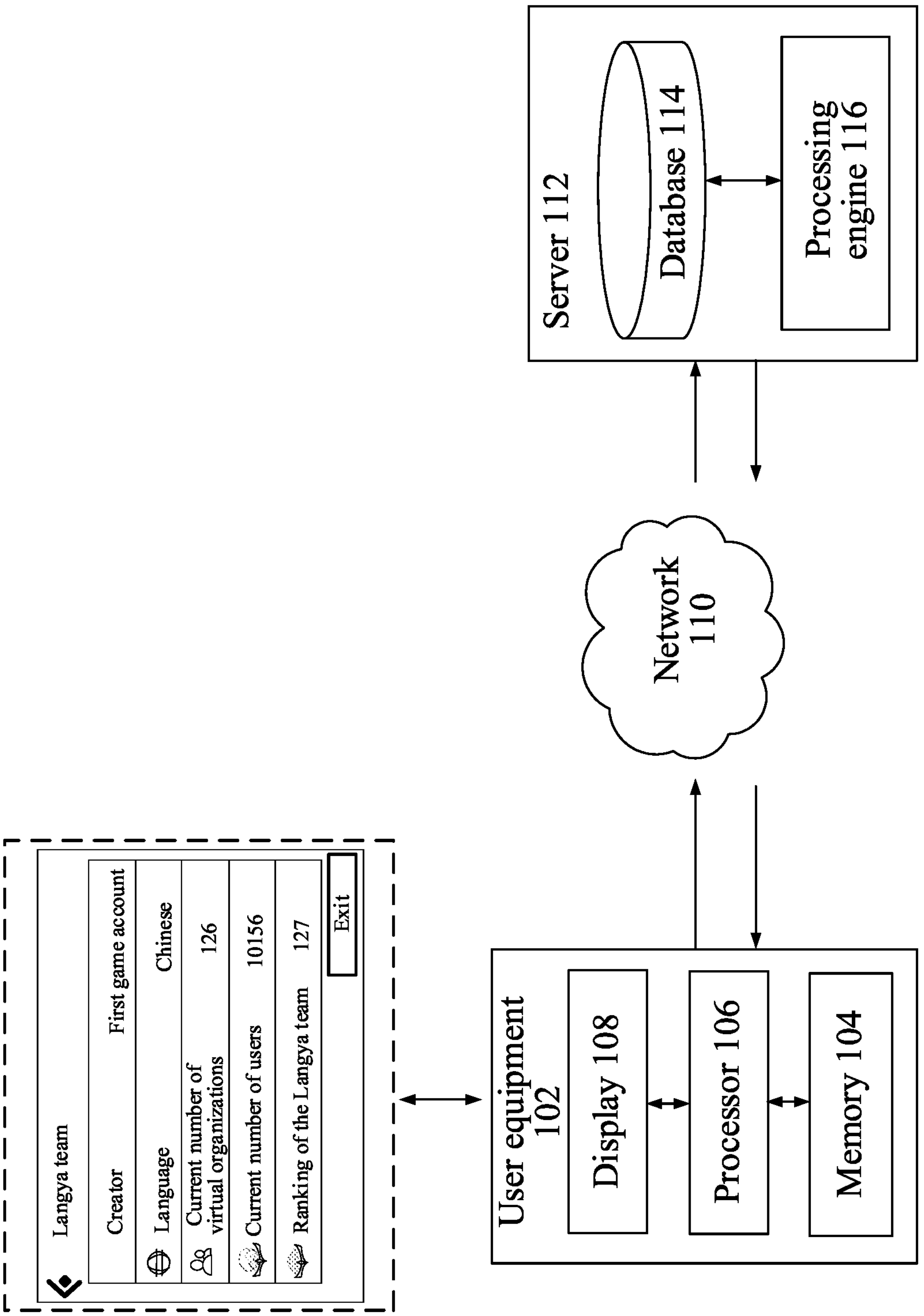
FIG. 1 is a schematic diagram of an application environment of a virtual organization creation method according to an embodiment of this application.

In the related art, privacy leakage of a player occurs in a manner of creating a virtual organization based an actual geographical location of the player. According to the embodiments of this application, a virtual organization creation method is provided, to resolve at least the technical problem of privacy leakage of players in the related art. In an implementation of this application, the virtual organization creation method may be applied to, but is not limited to, an environment shown in FIG. 1. The system environment includes user equipment 102, a network 110, and a server 112.

In some embodiments, the user equipment 102 includes a memory 104, a processor 106, and a display 108. The memory is configured to store game data in a target game application, for example, a first game account, a target virtual organization, an organization identifier, and a target virtual region. The processor is configured to process the game data in the target game application, including but not limited to: determining, in a preset virtual region set, a target virtual region matching a first IP address; and creating the target virtual organization located in the target virtual region in response to a creation instruction triggered by the first game account. The display may be configured to display the organization identifier of the target virtual organization, attribute information of the target virtual region, and the like. In this embodiment, the terminal device may be a terminal device equipped with a target client, including but not limited to at least one of the following: a mobile phone (for example, an Android-based mobile phone or an iOS-based mobile phone), a notebook computer, a tablet computer, a palmtop computer, a mobile Internet device (MID), a pad, a desktop computer, a smart television, and the like. The target client may be a video client, an instant messaging client, a browser client, an educational client, or the like. The network may include but is not limited to a wired network and a wireless network. The wired network includes a local area network, a metropolitan area network, and a wide area network. The wireless network includes Bluetooth, Wi-Fi, and another network for implementing wireless communication. The server may be a single server, a server cluster including a plurality of servers, or a cloud server. The foregoing is merely an example, and this is not limited in this embodiment.

In some embodiments, the network 110 may include but is not limited to a wired network and a wireless network. The wired network includes a local area network, a metropolitan area network, and a wide area network. The wireless network includes Bluetooth, Wi-Fi, and another network for implementing wireless communication.

In some embodiments, the server 112 may be a single server, a server cluster including a plurality of servers, or a cloud server. The server includes a database 114 and a processing engine 116. The database is configured to store data, including but not limited to the first game account, the target virtual organization, the organization identifier, the target virtual region, and the like in the target game application. The processing engine may be configured to create a virtual organization, including but not limited to: acquiring an organization identifier of a target virtual organization to be created by the first game account; determining, in a preset virtual region set, a target virtual region matching a first IP address; and responding to a creation instruction triggered by the first game account. The foregoing is merely an example, and this is not limited in this embodiment.

Figure 2:
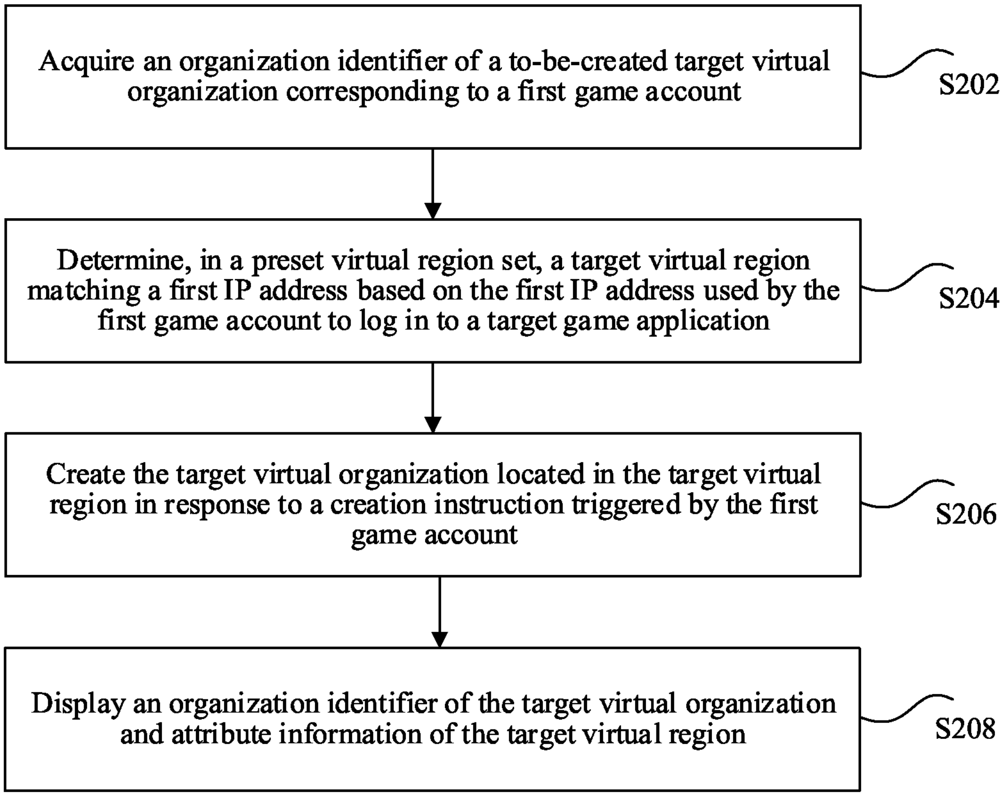
FIG. 2 is a schematic flowchart of a virtual organization creation method according to an embodiment of this application.

In some embodiments of this application, the virtual organization creation method is performed by user equipment. As shown in FIG. 2, the method includes the following steps:

Step S202: Acquire an organization identifier of a to-be-created target virtual organization corresponding to a first game account.

A virtual organization is an organization groups of users in a target game application, for example, may be a game association, that is, a player interaction group established within a game. A player logs in to the target game application through the first game account on the user equipment, and the player may create a virtual organization in a virtual world of the target game application. A virtual organization that corresponds to the first game account that is created by the player in the target game application on the user equipment is the target virtual organization. One virtual organization may include a plurality of game accounts. The organization identifier of the target virtual organization may be a name or an identity document (ID) of the target virtual organization to be created.

Step S204: Determine, in a preset virtual region set, a target virtual region matching a first IP address used by the first game account to log into the target game application, the target virtual region being a virtual region to which a country or an administrative region in which the first IP address is located is mapped.

The target game application may be a game application supporting creation of the target virtual organization, for example, a shooting game or a combat game. The IP address is a virtual Internet address. The virtual region set may include a plurality of virtual regions. The plurality of virtual regions include the target virtual region. The virtual regions in the virtual region set may be preset, and may be set based on countries or administrative regions. Assuming that virtual regions are divided by country, each country may be used as a virtual region. For example, China is used as a virtual region, and the United Kingdom is used as a virtual region. Because different countries have different cultural attributes, virtual regions divided based on countries may also be referred to as cultural regions. Assuming that virtual regions are divided by administrative region, for example, virtual regions may be divided for China based on provinces and cities. For example, Inner Mongolia is used as a virtual region, and Guangzhou is used as a virtual region. Because a same province or city has same cultural attributes, the virtual region may also be referred to as a cultural region. A virtual region may be named by using characters, for example, Arabic values or English letters.

Step S206: Create the target virtual organization located in the target virtual region in response to a generated creation instruction, the creation instruction being used for requesting to create the target virtual organization.

The target game application may display a game screen, and a virtual button may be set on the game screen. A player touches the virtual button to generate a creation instruction, to create the target virtual organization in a target cultural region. Assuming that the preset virtual regions are divided based on administrative regions and the player is located in Inner Mongolia, a creation instruction is generated in response to the operation of touching the virtual button by the player, to create the target virtual organization in a virtual region corresponding to Inner Mongolia.

Step S208: Display the organization identifier of the target virtual organization and attribute information of the target virtual region, the attribute information including a language used by a game account in the virtual organization created in the target virtual region.

The target virtual organization may also be referred to as a game association, and the organization identifier may be a name or an ID. The attribute information of the target virtual region may include the language allowed to be used by the game account in the virtual organization created in the target virtual region. The virtual region may be a virtual region corresponding to a country or an administrative region. For example, virtual regions may be divided by country. Chinese is commonly used in China, and a language used by a game account in a virtual region corresponding to China is Chinese. Russian is commonly used in Russia, and a language used by a game account in a virtual region corresponding to Russia is Russian. English is commonly used in the United Kingdom, and a language used by a game account in a virtual region corresponding to the United Kingdom is English. In a game application, a language used in a virtual region in which a virtual organization is located is displayed, so that game accounts using a same language can join one virtual organization. This avoids communication problems between game accounts in one virtual organization.

In the foregoing embodiment, when creating a virtual organization, a player uses an IP address used for logging in to a game client. The IP address is a virtual Internet address, but not an actual geographical location of the player. In this way, the actual geographical location of the player is not required during creation of the virtual organization, and the actual geographical location of the player is not recorded on the game client, so that the actual geographical location of the player is not disclosed. This greatly protects personal positioning information of the player, and avoids leakage of privacy data. In addition, a language allowed to be used by the player in the virtual region is displayed on the game client, but an actual geographical location of the virtual organization is not displayed. This also protects privacy of the player.

In addition, a virtual region division manner in this application can be set randomly, with high flexibility. In actual application, the virtual region division manner can further be dynamically adjusted based on requirement changes and data feedback. Although virtual regions are set in this application, a game screen of a game client displays attribute information of a virtual region (a language allowed to be used by a player in the virtual region), and the player is unaware of the concept of the virtual region on the client. In this way, a player only needs to know a language used in a virtual organization created or joined by the player, and does not need to know an actual geographical location of the virtual organization. This greatly protects privacy of players in the virtual organization.

In some embodiments, the acquiring an organization identifier of a target virtual organization to be created by a first game account includes: displaying a creation screen (which may also be referred to as a creation interface) in the target game application to which the first game account has logged in, the creation screen including an identifier input region, the identifier input region being used for inputting the organization identifier of the target virtual organization; and acquiring the input organization identifier of the target virtual organization from the identifier input region on the creation screen; after the determining, in a preset virtual region set, a target virtual region matching the first IP address, the method further includes: displaying the attribute information of the target virtual region on the creation screen; and the creating the target virtual organization located in the target virtual region in response to a creation instruction triggered by the first game account includes: when the input organization identifier of the target virtual organization is acquired and the attribute information of the target virtual region is displayed on the creation screen, generating the creation instruction in response to a touch operation performed on a target virtual button on the creation screen, and creating the target virtual organization located in the target virtual region in response to the creation instruction.

Figure 3:
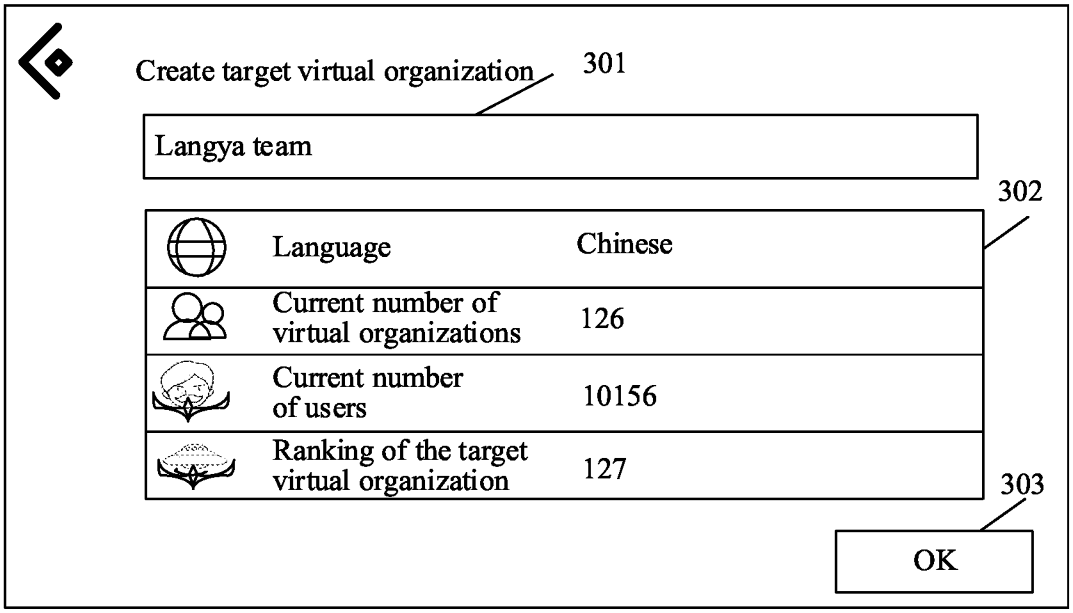
FIG. 3 is a schematic diagram of a creation screen of a target virtual image according to an embodiment of this application.

In an implementation of this application, FIG. 3 is a schematic diagram of a virtual organization creation screen according to an embodiment of this application. After the first game account logs in to the target game application, the virtual organization creation screen shown in FIG. 3 may be displayed in the target game application, and the first game account may be used for creating the target virtual organization on the game screen. As shown in the figure, the virtual organization creation screen includes an identifier input region 301. The organization identifier of the target virtual organization may be input to the identifier input box 301. The organization identifier may be a name (for example, "Langya team" in the figure) of the target virtual organization or an ID (the ID may be represented by using characters, and may be digits or letters, or may be digits and letters) of the target virtual organization. In the identifier input region 301 on the creation screen, the organization identifier of the target virtual organization that is input by the user may be acquired. For example, the name of the target virtual organization may be input as Langya team. In this case, the acquired organization identifier of the target virtual organization is Langya team.

Assuming that virtual regions are divided by country and a login location represented by the first IP address of the first game account is Beijing, it is determined that a target virtual region corresponding to the first IP address a virtual region corresponding to China. The attribute information includes a language used by a game account in a virtual region, and a language commonly used in China is Chinese. Therefore, Chinese is displayed on the creation screen as a language used in the target virtual region. The creation screen shown in FIG. 3 displays the attribute information 302 of the target virtual region. The attribute information 302 may include a language used by a game account in a virtual organization created in the target virtual region. The attribute information of the virtual region may further include the number of virtual organizations in the virtual region, the current number of users, rankings of the virtual organizations, and the like. In this embodiment, the attribute information of the virtual region is displayed on the game screen, so that the player can learn of related information of the virtual region in which the virtual organization is to be created, for example, the language used in the virtual region, and the number of virtual organizations in the virtual region. The player can determine, based on the attribute information of the virtual region, whether to create the virtual organization in the virtual region. This improves game experience of the player.

The virtual organization creation screen further includes a target virtual button 303. The user touches the target virtual button in a lower right corner of the creation screen of the target virtual organization to generate a creation instruction. The target game application responds to the creation instruction, and creates a target virtual organization named Langya team in the virtual region based on the acquired name "Langya team" of the target virtual organization. In this embodiment, based on an IP address of a first account, a virtual region corresponding to the IP address may be matched in preset virtual regions in the background, and attribute information of the matched virtual region is displayed on a creation screen, to notify a player of a language used in a virtual organization created in the virtual region, and other information (the current number of virtual organizations, the current number of users, rankings of the virtual organizations, and the like) of the cultural region. The player touches a virtual button to determine whether to create a virtual organization in the virtual region. The creation screen enables a user to conveniently create a virtual organization, thereby improving user experience.

In some embodiments, the displaying the organization identifier of the target virtual organization and attribute information of the target virtual region includes: in the target game application to which the first game account has logged in, displaying the first game account, the organization identifier of the target virtual organization, and the attribute information of the target virtual region that have a correspondence, the first game account being marked as a creator of the target virtual organization, and the organization identifier of the target virtual organization and the attribute information of the target virtual region being set to be visible to a game account in the target virtual region or visible to game accounts in some or all virtual regions in the virtual region set.

Figure 4:
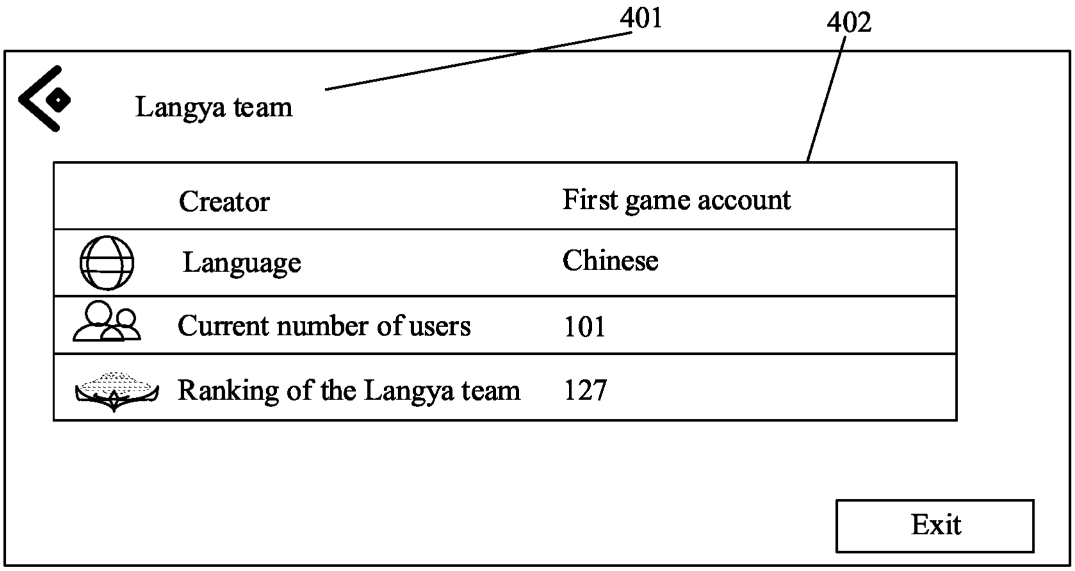
FIG. 4 is a first schematic diagram of a game screen according to an embodiment of this application.

In an implementation of this application, the target virtual organization created by the first game account may be displayed in the target game application to which the first game account has logged in. FIG. 4 is a first schematic diagram of a game screen according to an embodiment of this application. The game screen is a real game screen in the target game application to which the first game account has logged in. An identifier (for example, "Langya team" in the figure) of a virtual organization may be displayed on the game screen. Assuming that the organization identifier of the target virtual organization is an organization name, the organization name may be Langya team. As shown in FIG. 4, on the display screen, the name 401 of the target virtual organization is displayed as Langya team. The display screen may further display a creator of the virtual organization, namely, the first game account, the number of users in the virtual organization, and the attribute information of the virtual region in which the target virtual organization is located, for example, the language (Chinese shown in the figure) used by the game account in the virtual region in which the target virtual organization is located, and a ranking of the target virtual organization (Langya team) in the virtual region. That is, a correspondence between the target virtual organization and the creator of the target virtual organization, namely, the first game account, is displayed in the target game application to which the first game account has logged in. In an attribute display region 402, attribute information related to the target virtual region may further displayed, including the language Chinese allowed to be used in the target virtual region, the current number of virtual organizations in the target virtual region, the current number of users in the target virtual organization, rankings of the virtual organizations in the virtual region, and the like. In this embodiment, the virtual organization created by the player is visible to a game account in the same virtual region, but the virtual organization is invisible to a player in a different virtual region. This can greatly protect privacy of players in each cultural region.

Figure 5:
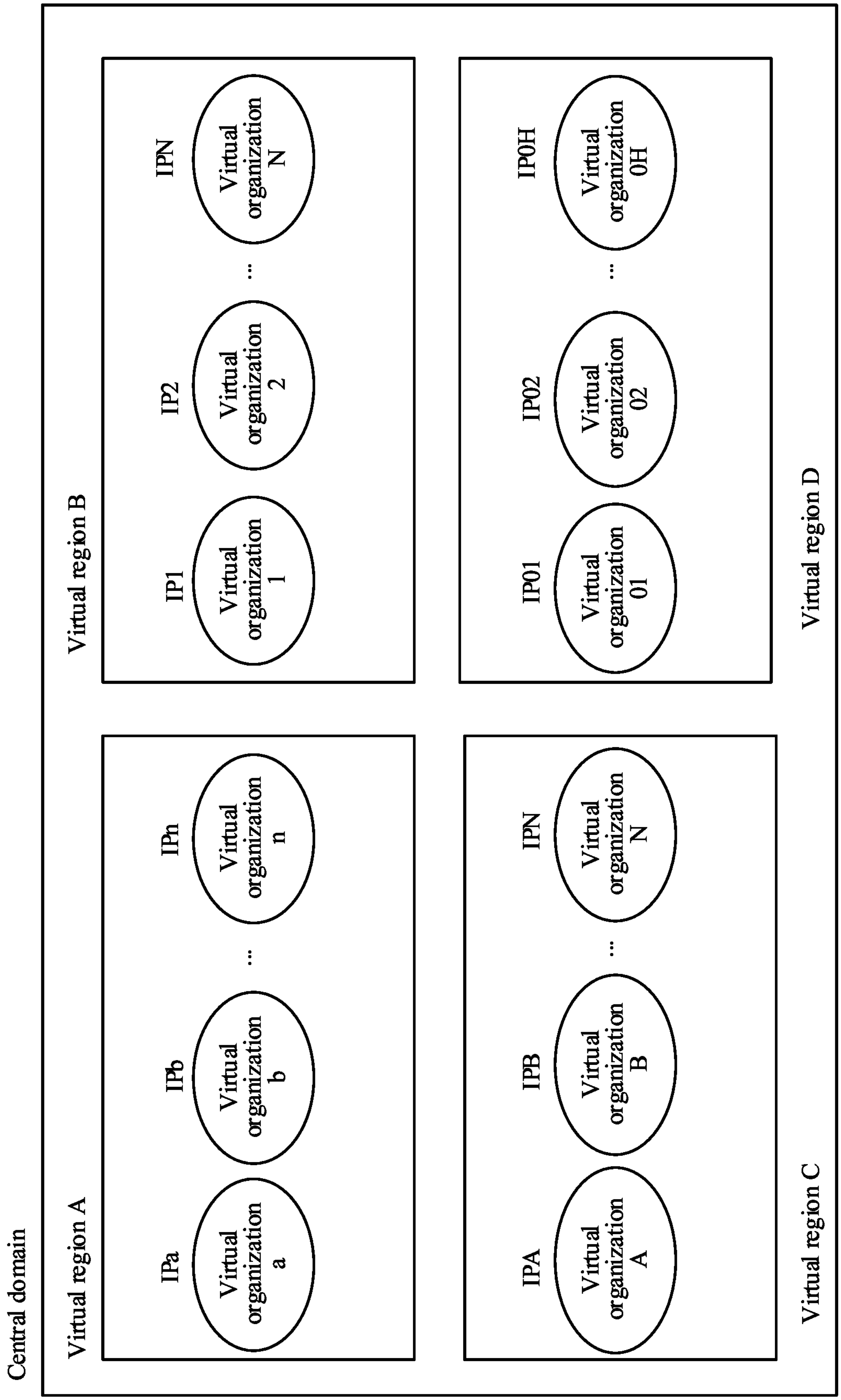
FIG. 5 is a first schematic diagram of a relationship according to an embodiment of this application.

In an implementation of this application, a central domain may include a plurality of virtual regions (the virtual regions in this application may also be called cultural regions). A plurality of virtual organizations may be created in each virtual region. Each virtual organization corresponds to a same login location, and the login location corresponds to an IP address. FIG. 5 is a first schematic diagram of a relationship according to an embodiment of this application. A central domain includes virtual regions A, B, C and D, and a plurality of virtual organizations may be created in each virtual region. For example, virtual organizations a, b, . . . , n are created in a virtual region a in the figure. A virtual region B includes virtual organizations 1, 2, . . . , and N. The number of virtual regions included in the central domain and the number of virtual organizations included in each virtual region in the figure are only examples for describing this application. The specific number may be set based on actual conditions.

Virtual regions are divided by country or administrative region. It is assumed that virtual regions are divided by country. It is assumed that the virtual region A corresponds to China, the virtual region B corresponds to Russia, the virtual region C corresponds to the United Kingdom, and the virtual region D corresponds to Japan. The following describes an example of creating the target virtual organization by the first game account in the target virtual region.

It is assumed that an IP address used by the first game account to log in to the target game application is IPn+1 (IPn+1 is only used for describing this application, and a specific IP address is consistent with actual conditions). A login location of the first game account may be determined based on a mapping relationship between an IP address and an actual geographical location. Assuming that an actual geographical location mapped to Ipn+1 is Beijing, it can be determined that the login location of the first game account is Beijing. Beijing is located in China, and therefore a target game account creates a virtual organization n+1 in the virtual region A in response to a creation instruction of the first game account.

Figure 6:
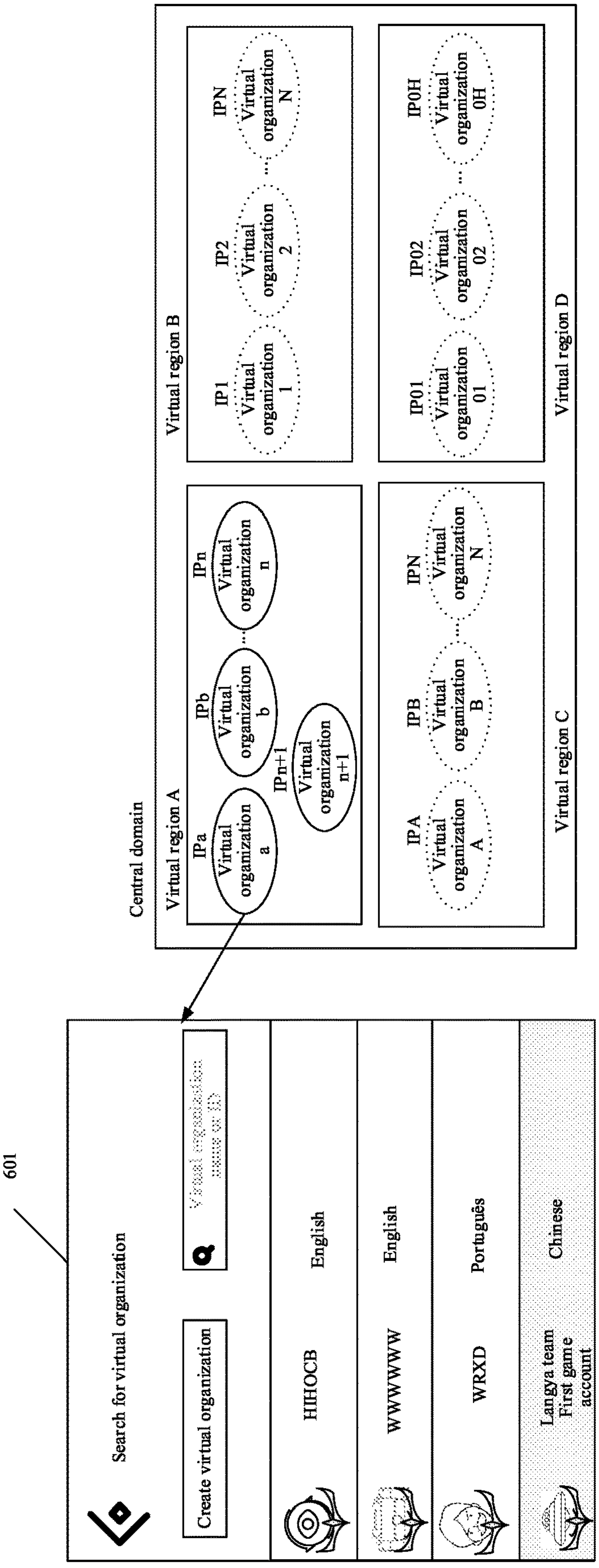
FIG. 6 is a second schematic diagram of a relationship according to an embodiment of this application.

FIG. 6 is a second schematic diagram of a relationship according to an embodiment of this application. The virtual organization n+1 created by the first game account in the virtual region A is visible to a game account belonging to the virtual region A. As shown in the figure, a solid line means being visible, and a dashed line means being invisible. The virtual organization n+1 is visible to a game account in each virtual organization in the virtual region A. For example, a game screen 601 is displayed in a game application to which a game account in the virtual organization a in the cultural region A has logged in. The game screen displays the virtual organization "Langya team" created by the first game account.

Figure 7:
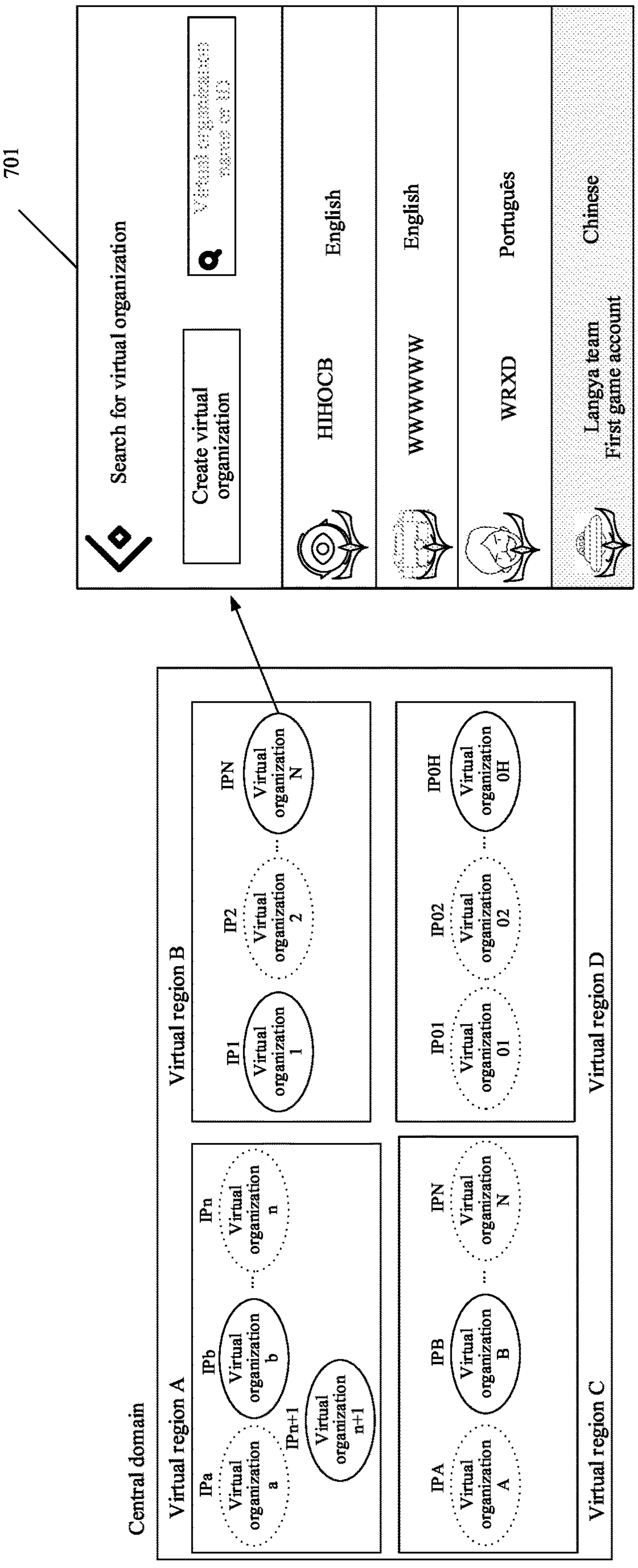
FIG. 7 is a third schematic diagram of a relationship according to an embodiment of this application.

In an implementation of this application, the first game account may set a visibility scope of the virtual organization created by the first game account. The visibility scope may be game accounts in a same virtual region, or may be game accounts in different virtual regions. The first game account creates the virtual organization n+1 in the virtual region A, and the first game account can set a visibility scope of the virtual organization n+1. FIG. 7 is a third schematic diagram of a relationship according to an embodiment of this application. In a virtual region, a solid line means being visible, and a dashed line means being invisible. The virtual organization n+1 created by the first game account is located in the virtual region A. The first game account may set the virtual organization to be visible to game accounts in other virtual regions (the virtual region B, the virtual region C, and the virtual region D). For example, in FIG. 7, the virtual organization is set to be visible to game accounts in the virtual organization N in the virtual region B. In this case, a game screen 701 may be displayed in a game application to which a game account in the virtual organization N has logged in. The game screen displays information about the target virtual organization ("Langya team") created by the first game account. In this embodiment, a player can set a visibility scope of a virtual organization created by the player, and can set the virtual organization to be visible to players in the same virtual region, or may set the virtual organization to be visible to players in different virtual regions. This can improve flexibility of the visibility scope of the virtual organization, and the play can set the visibility scope of the virtual organization according to a requirement of the player, thereby greatly protecting privacy of players.

In some embodiments, a virtual region matching a second IP address is determined in the virtual region set based on the second IP address used by a second game account to log in to the target game application; and when the virtual region matching the second IP address is the target virtual region, the identifier of the target virtual organization and the attribute information of the target virtual region are displayed in the target game application to which the second game account has logged in.

In an implementation of this application, after the first game account creates the target virtual organization in the target virtual region, other game accounts belonging to the target virtual region can view related information of the target virtual organization. It is assumed that the first game account creates the target virtual organization "Langya team" in a target virtual region corresponding to China. The second game account logs in to the target game application through the second IP address. A login location of the second game account may be determined based on the second IP address. When the login location of the second game account is Beijing, it is determined that the second game account belongs to the target virtual region corresponding to China. In the target application to which the second game account has logged in, a game screen shown in FIG. 8 may be displayed. The game screen includes a virtual organization list. A plurality of virtual organizations are displayed in the organization list. The plurality of virtual organizations include the target virtual organization ("Langya team" in the figure). When the second game account selects any virtual organization in the organization list, related information of the selected virtual organization may be displayed on the game screen. For example, as shown in the figure, "Langya team" is selected, and related information of "Langya team" is displayed on the right of a virtual organization search screen. The related information includes but is not limited to the identifier ("Langya team") the target virtual organization, the creator (the first game account) of the target virtual organization, and creation time (12/20/20 indicates that the creation time is Dec. 20, 2020) of the target virtual organization, as shown in the figure. In this embodiment, when a player logs in to a game client, the user can see virtual organizations created by other players. In this way, the player can select a virtual organization that the user wants to join based on related information of the virtual organizations (for example, languages allowed to be used in the virtual organizations, and the number of players in the virtual organizations). After joining the virtual organization, the player may team up with members of the virtual organization to play a game, and can also exchange information. This greatly improves game experience of players.

In some embodiments, in the target game application to which the second game account has logged in, a join request instruction triggered by the second game account is acquired, the join request instruction being used for requesting to add the second game account to the target virtual organization; and when the second game account is successfully added to the target virtual organization in response to the join request instruction, the second game account, the organization identifier of the target virtual organization, and the attribute information of the target virtual region that have a correspondence are displayed.

Figure 8:
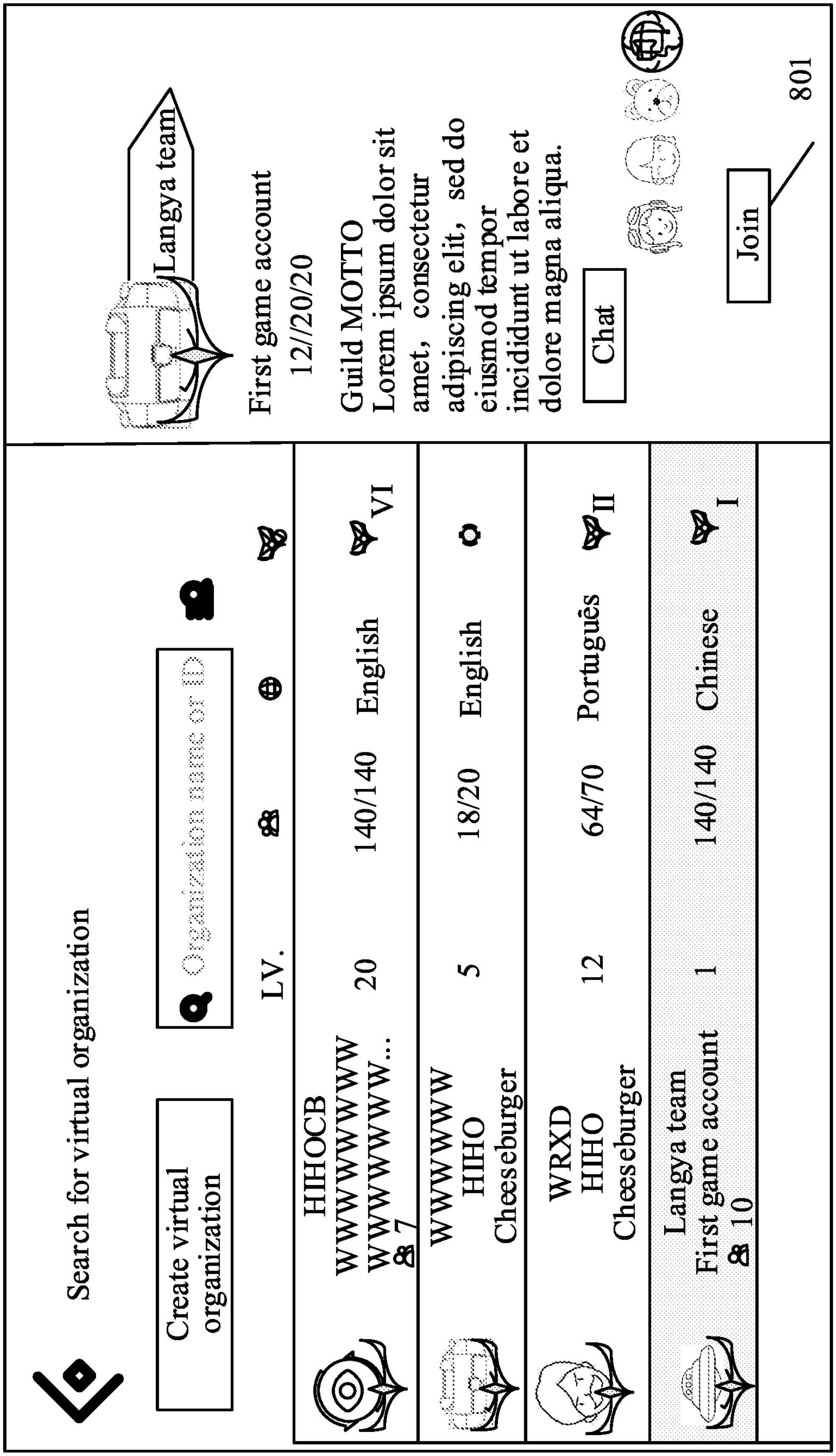
FIG. 8 is a second schematic diagram of a game screen according to an embodiment of this application.

In an implementation of this application, the second game account belonging to the target virtual region logs in to the target game application, and the screen shown in FIG. 8 may be displayed, and the game screen includes the virtual organization list and a virtual button 801. A virtual organization in the organization list may be a virtual organization recommended to the second game account. When it is detected that the virtual button is touched, a join request instruction is generated. The target game application responds to the triggered join request instruction, and successfully adds the second game account to the target virtual organization. For example, details of the "Langya team" is displayed in FIG. 8. When the player touches a virtual button "Join" in the details of the "Langya team", the second game account joins the "Langya team".

In some embodiments, a virtual region matching a third IP address is determined in the virtual region set based on the third IP address used by a third game account to log in to the target game application; and when the virtual region matching the third IP address is not the target virtual region but the organization identifier of the target virtual organization and the attribute information of the target virtual region are set to be visible to a game account in the virtual region matching between the third IP address, the identifier of the target virtual organization and the attribute information of the target virtual region are displayed in the target game application to which the third game account has logged in.

In an implementation of this application, when a virtual organization is set to be visible to game accounts in other virtual regions, the game accounts in the other virtual regions can view related information of the virtual organization. An IP address of the third game account is acquired when the third game account logs in to the target game application. A virtual region to which the third game account belongs may be determined based on the IP address of the third game account. For example, virtual organizations are divided based on administrative regions. It is assumed that Inner Mongolia and Beijing belong to different cultural regions, the first game account creates the virtual organization "Langya team" in a virtual region corresponding to Inner Mongolia, and the virtual organization "Langya team" is set to be visible to game accounts in other virtual regions. When a login location corresponding to the IP address of the third game account is Beijing, related information of the "Langya team" can be viewed in the target game application to which the third game account has logged in. The name "Langya team" of the target virtual organization created by the first game account, the creator of the name "Langya team" of the target virtual organization, namely, the first game account, and the attribute information of the first virtual region, including the language "Chinese" allowed to be used in the first virtual region or the like, may be displayed in the target game application to which the third game account has logged in. In this embodiment, visible virtual organizations can be viewed on a client to which a game account has logged in, but invisible virtual organizations cannot be viewed. This can protect privacy of players in the virtual organizations.

In some embodiments, the determining, in a preset virtual region set, a target virtual region matching a first IP address used by the first game account to log into the target game application includes: determining a target login location of the first game account based on the first IP address used by the first game account to log in to the target game application; and determining, in the virtual region set, the target virtual region corresponding to the target login location based on a correspondence between each virtual region in the virtual region set and one or more login locations.

In an implementation of this application, the first game account logs in to the target game application through the first IP address, and a login location of the first game account may be determined based on a correspondence between an IP address and an actual geographical location. The first IP address used by the first game account to connect to a lobby server (also referred to as a first server) of the target game application is actually a virtual location. The virtual location can reflect an actual location of the user to some extent when the user does not intentionally modify the virtual location. Assuming that a virtual location corresponding to the first IP address is Shenzhen, China, it can be determined that the target login location of the first game account is Shenzhen, China.

Assuming that virtual regions are divided by country, a language commonly used in China is Chinese, and therefore a virtual region A in which a common language is Chinese is preset; and a language commonly used in Russia is Russian, and therefore a virtual region B in which a common language is Russian is preset. Based on a mapping relationship between an IP address and an actual geographical location in the related art, the login location of the first game account may be determined based on the IP address used by the first game account to log in to the target game application. For example, an actual geographical location corresponding to an IP address 106.121.69.14 is Beijing. Based on the IP address, it can be determined that the login location of the first game account is Beijing. Based on the preset virtual regions, it can be determined that Beijing is located in China, and then it can be determined that a virtual region corresponding to this IP address is the virtual region A The target virtual region to which the first account belongs may be acquired from the virtual region set based on the target login location by reading configurations. The target login location of the first game account may be determined based on the first IP address. A country or an administrative region to which the target login location belongs may be determined based on a relationship between the target login location and the country or the administrative region. The target virtual region corresponding to the first IP address may be determined based on a correspondence between a country or an administrative region and a preset virtual region. For example, the target login location and the corresponding target virtual region are stored in a configuration file. Assuming that the target login location is Shenzhen, China, a virtual region corresponding to Shenzhen, China is the target virtual region, and therefore a correspondence between Shenzhen, China and the target virtual region is stored in the configuration file. When the first game account logs in to the target game application, the first virtual IP address is first converted into the target login location Shenzhen, China, and then it is determined, by using the configuration file, that the corresponding target virtual region is the first virtual region.

One target virtual region may correspond to a plurality of login locations, and the login location of the first game account is the target login location. A correspondence between a login location and a virtual region may be stored in the configuration file. Assuming that virtual regions are divided by administrative region, Beijing and Inner Mongolia belong to different administrative regions, and correspond to different virtual regions. It is assumed that Beijing corresponds to a virtual region A and Inner Mongolia corresponds to a virtual region B. A correspondence may be established between a login location in Beijing and the virtual region A. For example, correspondences may be established between the virtual region A and different login locations such as Haidian District, Changping District, and Chaoyang District. A correspondence may be established between a login location in Inner Mongolia and the virtual region B. Correspondences are established between the virtual region B and different login locations such as Hohhot and Baotou. The foregoing correspondences may be stored in the configuration file. When a game account logs in to the target game application, a target virtual region corresponding to a target login location may be determined in the virtual region set based on the configuration file.

In some embodiments, the determining a target login location of the first game account based on the first IP address used by the first game account to log in to the target game application includes: determining the target login location of the first game account based on the first IP address used by the first game account to log in to the target game application and the lobby server of the target game application to which the first game account is connected.

In an implementation of this application, the first game account connects to the lobby server of the target game application when logging in to the target game application. It can be determined, based on the first IP address used by the first game account to log in to the target game application and the lobby server to which the first game account is connected, the login location of the first game account is the target login location. Assuming that the first IP address is 106.121.69.14, it can be determined that, based on the first IP address and the connected lobby server, that the target login location is Beijing, China.

In some embodiments, after the determining a target login location of the first game account, the method further includes: determining, in a combat server set, a target combat server corresponding to the target login location based on a correspondence between each combat server (also referred to as a second server) in the combat server set of the target game application and one or more login locations.

In an implementation of this application, the combat server is a server that a user connects to during real-time combat entertainment in the target game application. After it is determined that the target login location of the first game account is Beijing, China, a combat server corresponding to the target login location may be determined based on the configuration file of a correspondence between a login location and a combat server. Assuming that combat servers in the combat server set include an East China combat server, a Central China combat server, a South China combat server, and a North China combat server, the combat servers in the combat server set may be configured in a correspondence to login locations. For example, login locations Beijing, China and Tianjin, China correspond to the North China combat server in the combat server set; login locations Shanghai, China and Zhejiang, China correspond to the East China combat server in the combat server set; and login locations Hunan, China and Hubei, China correspond to the Central China combat server in the combat server set. When it is determined that the target login location is Hunan, China, it can be determined, in the combat server set, that a target combat server corresponding to Hunan, China is the Central China combat server.

In some embodiments, a mapping relationship is established between the target virtual organization, the target virtual region, the target combat server, and a target virtual central domain, the target virtual central domain being a virtual central domain that is in a preset virtual central domain set and that matches the lobby server of the target game application to which the first game account is connected, and each virtual central domain in the virtual central domain set including one or more virtual regions in the virtual region set; and the mapping relationship is stored in a virtual organization database.

In an implementation of this application, after the first game account creates the target virtual organization in the target game application, a mapping relationship needs to be established between the target virtual organization, the target virtual region, the target combat server, and the target virtual central domain.

Figure 9:
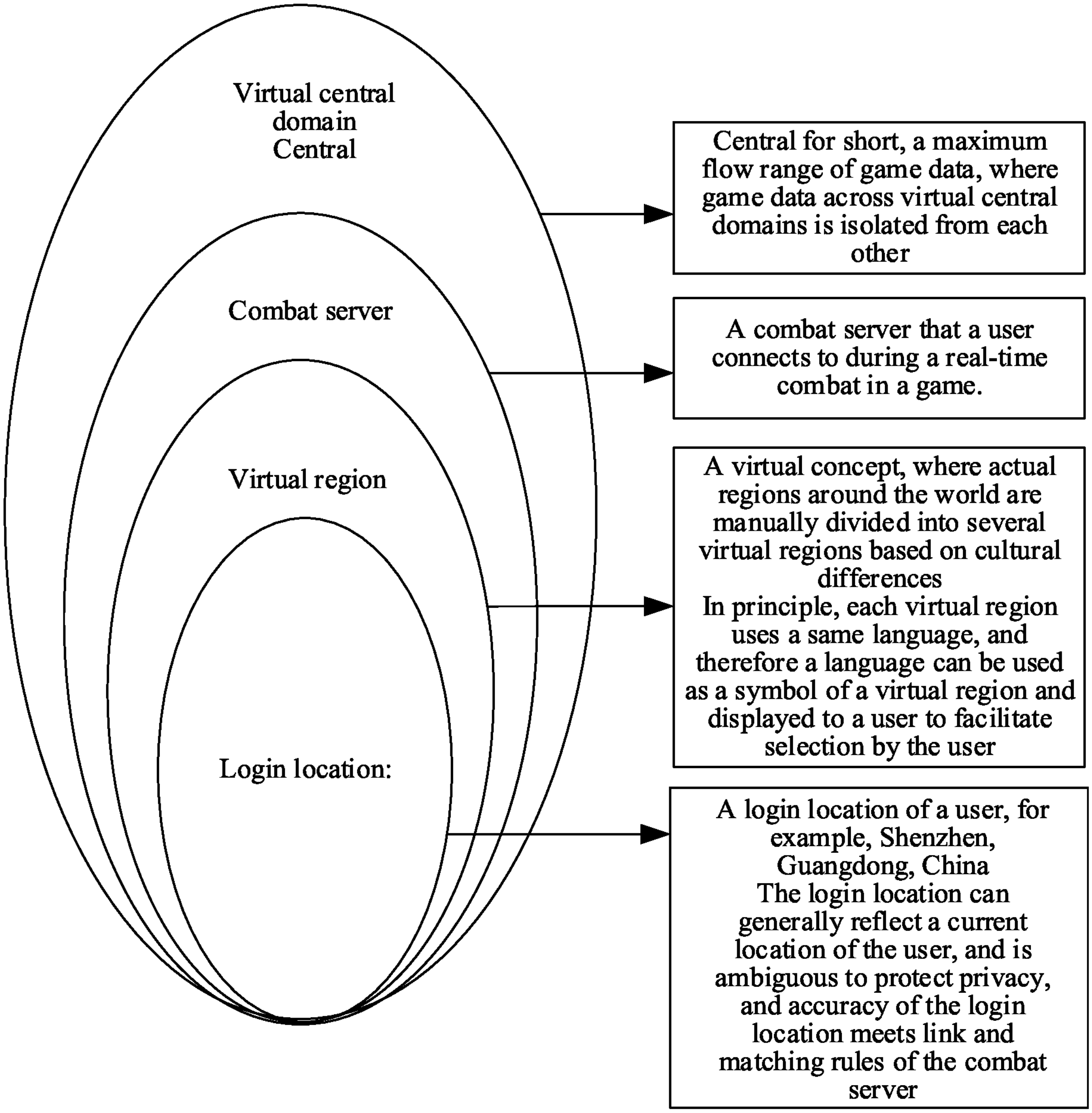
FIG. 9 is a fourth schematic diagram of a relationship according to an embodiment of this application.

In an implementation of this application, the central domain is a maximum flow range of game data, and game data across central domains is isolated from each other. Different games have different central domains. For example, a racing game A and a shooting game B have different central domains. FIG. 9 is a fourth schematic diagram of a relationship according to an embodiment of this application. The figure includes a relationship between a central domain, a combat server, a virtual region, and a login location. A virtual central domain, central for short, is a maximum flow range of game data, and game data across virtual central domains is isolated from each other. The combat server is a combat server that a user connects to during a real-time combat in a game. The virtual region is a virtual concept, and actual regions around the world may be manually divided into several virtual regions based on cultural differences. Each virtual region may use a same language, and therefore a language may be used as a symbol of a virtual region and displayed to a user to facilitate selection by the user. A login location of a user may be, for example, Shenzhen, Guangdong, China. The login location can generally reflect a current location of the user, and is ambiguous to protect privacy, and accuracy of the login location meets link and matching rules of the combat server.

For example, three virtual central domains corresponding to virtual organizations of the target game application may be set, including a China central domain, a Eurasia central domain, and an America central domain. The three central domains are not exactly the same as actual geographical locations. Actually, two combat servers belonging to different central domains may be deployed in a same place. However, conventionally, intercontinental names may still be used for naming virtual central domains, to reduce communication and understanding costs. The foregoing division of virtual central domains is only an implementation, and a division manner of virtual central domains is not limited. In different game applications, regions requiring hard isolation may be divided into different virtual central domains according to actual requirements and scenarios. For example, virtual central domains may be classified into domestic virtual central domains and international virtual central domains.

16 combat servers corresponding to the virtual organizations of the target game application may be set, including the East China combat server, the Central China combat server, the South China combat server, and the North China combat server that belong to the China central domain; a Bangkok combat server, a Hong Kong combat server, a Taiwan combat server, a Tokyo combat server, a Seoul combat server, a Singapore combat server, a Sydney combat server, a Frankfurt combat server, a Moscow combat server, and a Bahrain combat server that belong to the Eurasian central domain; and a Virginia combat server, a Silicon Valley combat server, and a St. Paul combat server that belong to the America central domain. Combat servers are named by using geographical names for the same reason as that of naming virtual central domains by using intercontinental names.

A virtual region is the smallest unit of virtual organization division. Virtual regions may be named by using Arabic numerals. Virtual regions may be divided into more than 50 virtual regions. The virtual regions are divided mainly by summarizing a degree of cultural similarity between more than 300 countries or regions in the world. Virtual region division criteria may be determined based on subjective judgment of a product. Therefore, the foregoing virtual region division manner may be dynamically adjusted with increasing user data and feedback results. A virtual region may be divided into a plurality of virtual regions. A virtual region obtained through division has a language attribute, and the language may be used as an explicit symbol of the virtual region. A virtual region is determined based on a current login location of a user, and the user may choose to join a virtual organization belonging to a same virtual region as the user.

The foregoing virtual central domain and combat server may be named by using geographical concepts. A user is unaware of the virtual central domain, the combat server, or even the virtual region. Instead, a language used in a virtual organization is displayed to a user, so that a virtual organization user finds a suitable virtual organization. In a current game environment, language is a neutral label, unlike countries and regions, because language is rarely subject to negative impact.

Figure 10:
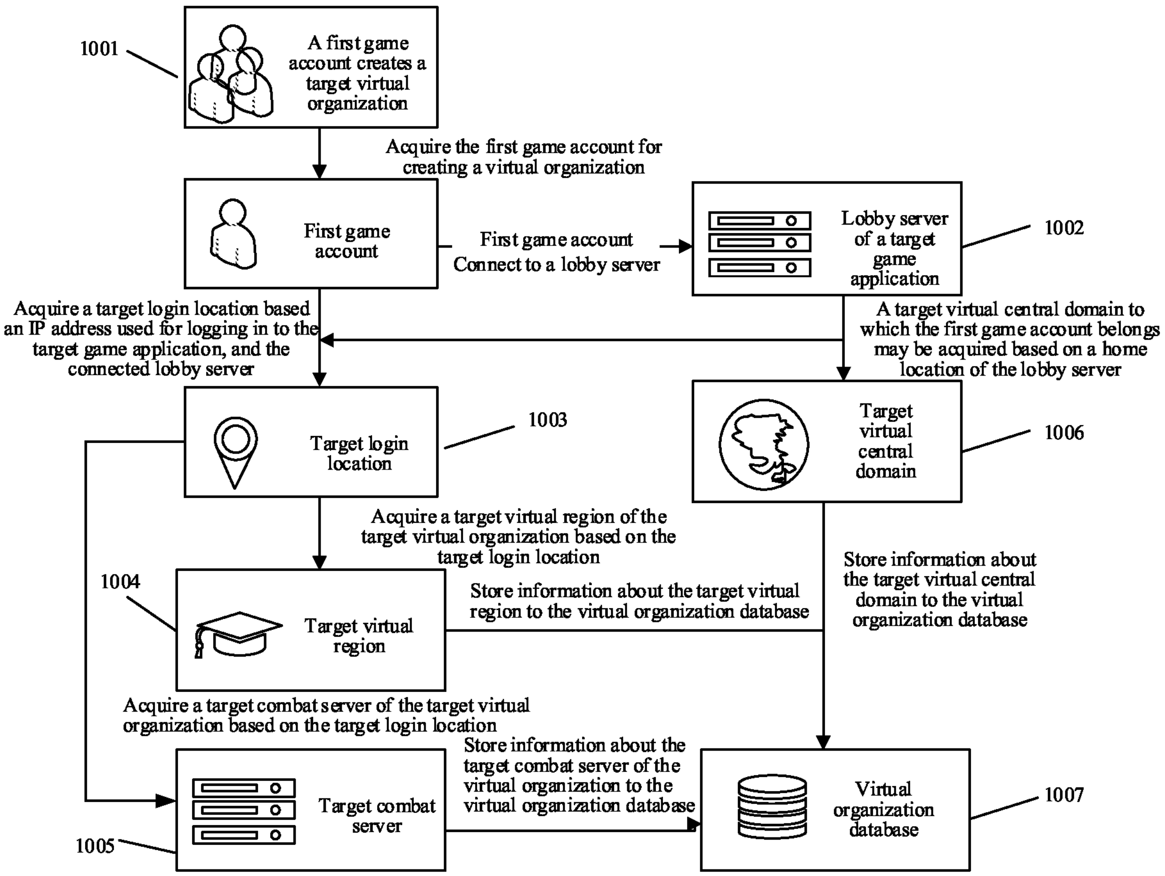
FIG. 10 is an overall flowchart of a target virtual organization creation method according to an embodiment of this application.

FIG. 10 is an overall flowchart of a target virtual organization creation method according to an embodiment of this application. The method includes the following steps:

Step S1001: Use a first game account to log in to a target game application, and enter an identifier of a target virtual organization on a creation page in the target game application.

Step S1002: Acquire a lobby server that the first game account connects to when logging in to the target game application.

Step S1003: Determine a target login location of the first game account based on an IP address used by the first game account to log in to the target game application, and the connected lobby server.

Step S1004: Acquire, based on the target login location, a target virtual region to which the target virtual organization belongs.

Step S1005: Acquire a target combat server that the first game account connects to when participating in a game in the target game application.

Step S1006: Acquire, based on a home location of the lobby server, a target virtual central domain to which the first game account belongs.

Step S1007: Establish an association relationship between the target combat server, the target virtual region, the target virtual organization, and the target virtual central domain, and store the association relationship in a virtual organization database.

In an implementation of this application, a creator creates the target virtual organization through the first game account, and a target game application acquires the first game account for creating the target virtual organization, and uses the first game account to connect to the lobby server of the target game application. The target virtual central domain to which the first game account belongs may be acquired based on the home location of the lobby server of the target game application, and information about the target virtual central domain matching the target virtual organization is stored in the virtual organization database. For example, a virtual central domain set may include a China central domain, a Eurasia central domain, and an America central domain, and the target virtual central domain may be the China central domain.

After acquiring the first game account for creating the target virtual organization, the target game application acquires the target login location of the first game account based on the first IP address of the first game account and the lobby server to which the target game application is connected, acquires the target virtual region of the target virtual organization based on the target login location, and stores information about the target virtual region in the virtual organization database. Assuming that the target login location is Beijing, China, it can be determined, based on the target login location Beijing, China, that a virtual region is a target virtual region in which a commonly used language is Chinese.

After acquiring the target login location of the first game account, the target game application may further acquire the target combat server of the target virtual organization based on the target login location, and store information about the target combat server of the virtual organization in the virtual organization database. Assuming that the target login location is Beijing, China, it can be determined, based on the target login location Beijing, China, that the target combat server is the North China combat server.

In an implementation of this application, in a multiplayer online tactical competition game, players may choose, from various types of characters, types that they are good at, and start a combat as two opposing teams (usually in a 5 V 5 form). A condition of victory is breaking through a defense line and destroying a building guarded by an opposing team.

To simplify the description, the foregoing method embodiments are described as a series of action combination. But a person of ordinary skill in the art is to know that this application is not limited to any described sequence of the action, as some steps can adopt other sequences or can be executed simultaneously according to this application. In addition, a person skilled in the art is also to know that all the embodiments described in the specification are preferred embodiments, and the related actions and modules are not necessarily mandatory to this application.

Figure 11:
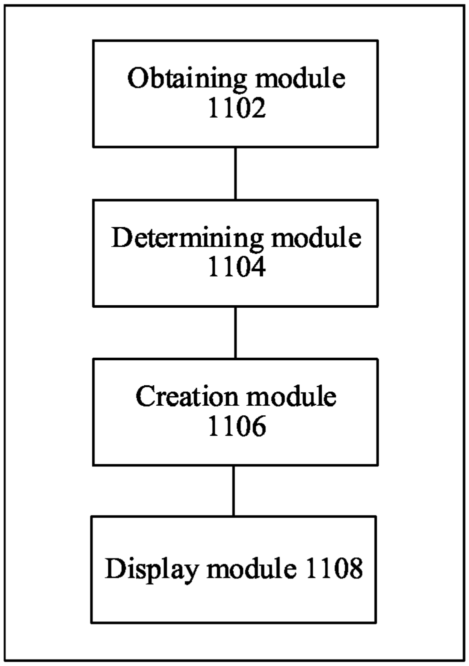
FIG. 11 is a schematic structural diagram of a virtual organization creation apparatus according to an embodiment of this application.

According to another aspect of the embodiments of this application, a virtual organization creation apparatus for implementing the foregoing virtual organization creation method is further provided. As shown in FIG. 11, the apparatus includes: an acquisition module 1102, configured to acquire an organization identifier of a to-be-created target virtual organization corresponding to a first game account; a determining module 1104, configured to determine, in a preset virtual region set, a target virtual region matching a first IP address used by the first game account to log into the target game application, the target virtual region being a virtual region to which a country or an administrative region in which the first IP address is located is mapped; a creation module 1106, configured to create the target virtual organization located in the target virtual region in response to a generated creation instruction, the creation instruction being used for requesting to create the target virtual organization; and a display module 1108, configured to display the organization identifier of the target virtual organization and attribute information of the target virtual region, the attribute information including a language used by a game account in the virtual organization created in the target virtual region.

In some embodiments, the acquisition module in the apparatus is further configured to display a creation screen in the target game application to which the first game account has logged in, the creation screen including an identifier input region, the identifier input region being used for inputting the organization identifier of the target virtual organization; and acquire the input organization identifier of the target virtual organization from the identifier input region on the creation screen; the apparatus is further configured to: after the target virtual region matching the first IP address is determined in the preset virtual region set, display the attribute information of the target virtual region on the creation screen; and the creation module in the apparatus is further configured to: when the input organization identifier of the target virtual organization is acquired and the attribute information of the target virtual region is displayed on the creation screen, generate the creation instruction in response to a touch operation performed on a target virtual button on the creation screen, and create the target virtual organization located in the target virtual region in response to the creation instruction.

In some embodiments, the display module in the apparatus is further configured to: in the target game application to which the first game account has logged in, display the first game account, the organization identifier of the target virtual organization, and the attribute information of the target virtual region that have a correspondence, the first game account being marked as a creator of the target virtual organization, and the organization identifier of the target virtual organization and the attribute information of the target virtual region being set to be visible to a game account in the target virtual region or visible to game accounts in some or all virtual regions in the virtual region set.

In some embodiments, the apparatus is further configured to determine, in the virtual region set, a virtual region matching a second IP address used by a second game account to log into the target game application; and when the virtual region matching the second IP address is the target virtual region, display the identifier of the target virtual organization and the attribute information of the target virtual region in the target game application to which the second game account has logged in.

In some embodiments, the apparatus is further configured to: in the target game application to which the second game account has logged in, acquire a join request instruction triggered by the second game account, the join request instruction being used for requesting to add the second game account to the target virtual organization; and when the second game account is successfully added to the target virtual organization in response to the join request instruction, display the second game account, the organization identifier of the target virtual organization, and the attribute information of the target virtual region that have a correspondence.

In some embodiments, the apparatus is further configured to determine, in the virtual region set, a virtual region matching a third IP address used by a third game account to log into the target game application; and when the virtual region matching the third IP address is not the target virtual region but the organization identifier of the target virtual organization and the attribute information of the target virtual region are set to be visible to a game account in the virtual region matching between the third IP address, display the identifier of the target virtual organization and the attribute information of the target virtual region in the target game application to which the third game account has logged in.

In some embodiments, the determining module in the apparatus is further configured to determine a target login location of the first game account based on the first IP address used by the first game account to log in to the target game application; and determine, in the virtual region set, the target virtual region corresponding to the target login location based on a correspondence between each virtual region in the virtual region set and one or more login locations.

In some embodiments, the determining module in the apparatus is further configured to determine the target login location of the first game account based on the first IP address used by the first game account to log in to the target game application and the lobby server of the target game application to which the first game account is connected.

In some embodiments, the determining module in the apparatus is further configured to determine, in a combat server set, a target combat server corresponding to the target login location based on a correspondence between each combat server in the combat server set of the target game application and one or more login locations.

In some embodiments, the determining module in the apparatus is further configured to establish a mapping relationship between the target virtual organization, the target virtual region, the target combat server, and a target virtual central domain, the target virtual central domain being a virtual central domain that is in a preset virtual central domain set and that matches the lobby server of the target game application to which the first game account is connected, and each virtual central domain in the virtual central domain set including one or more virtual regions in the virtual region set; and store the mapping relationship in a virtual organization database.

In this embodiment of this application, a virtual organization is created based on an IP address used by a game account to log in to a game application, and attribute information of a virtual region to which the virtual organization belong is displayed, instead of displaying an actual geographical location of a player, thereby avoiding leakage of the actual geographical location of the player. Further, virtual regions are preset based on countries or administrative regions. A player may create a virtual organization in a virtual region corresponding to an IP address. In this way, players in one virtual organization are in a same country or administrative region. This avoids communication problems between players from different countries or administrative regions due to cultural differences.

The sequence numbers of the foregoing embodiments of this application are merely for description purpose but do not imply the preference among the embodiments.

Figure 12:
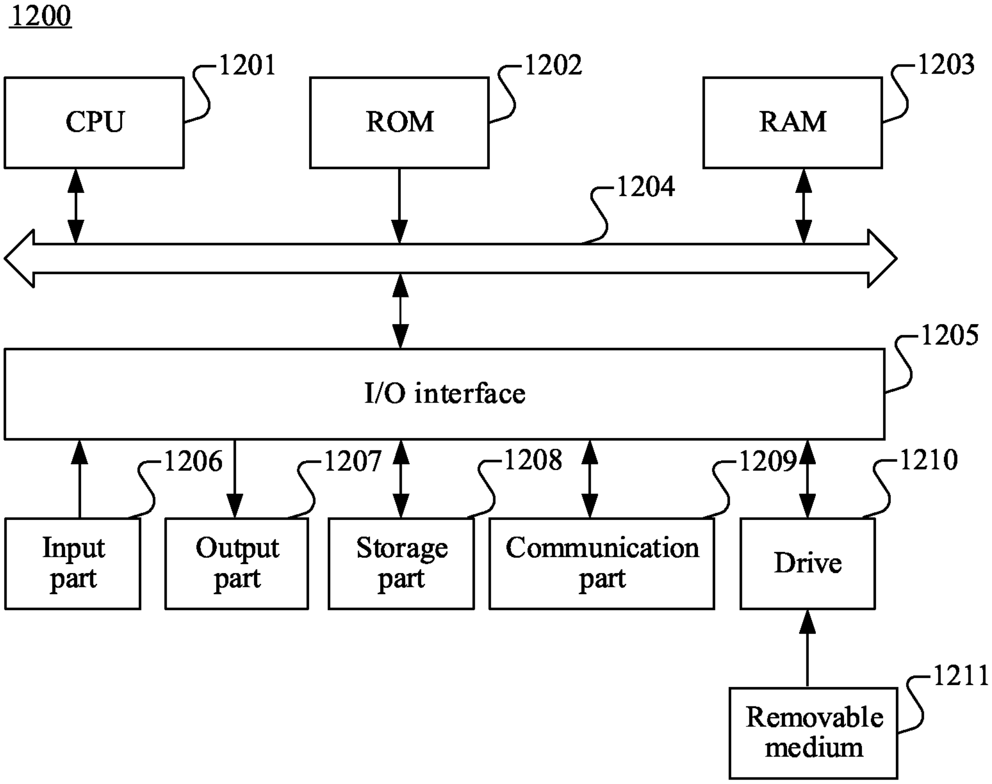
FIG. 12 is a structural block diagram of a computer system of an electronic device according to an embodiment of this application.

FIG. 12 is a schematic structural block diagram of a computer system of an electronic device for implementing the embodiments of this application.

The computer system 1200 of the electronic device shown in FIG. 12 is merely an example, and does not constitute any limitation on functions and use ranges of the embodiments of this application.

As shown in FIG. 12, the computer system 1200 includes a central processing unit (CPU) 1201, which may perform various appropriate actions and processing based on a program stored in a read-only memory (ROM) 1202 or a program loaded from a storage part 1208 into a random access memory (RAM) 1203. The random access memory 1203 further stores various programs and data required for system operations. The central processing unit 1201, the read-only memory 1202, and the random access memory 1203 are connected to each other through a bus 1204. An input/output (I/O) interface 1205 is also connected to the bus 1204.

The following components are connected to an input/output interface 1205: an input part 1206 including a keyboard, a mouse, or the like; an output part 1207 including a cathode ray tube (CRT), a liquid crystal display (LCD), a speaker, or the like; a storage part 1208 including a hard disk, or the like; and a communication part 1209 including a network interface card such as a local area network (LAN) card or a modem. The communication part 1209 performs communication processing by using a network such as the Internet. A driver 1210 is also connected to the input/output interface 1205 as required. A removable medium 1211, such as a magnetic disk, an optical disc, a magneto-optical disk, or a semiconductor memory, is installed on the drive 1210 as required, so that a computer program read from the removable medium is installed into the storage part 1208 as required.

Particularly, according to an embodiment of this application, the processes described in the method flowcharts may be implemented as computer software programs. For example, this embodiment of this application includes a computer program product, the computer program product includes a computer program carried on a computer-readable medium, and the computer program includes program code used for performing the methods shown in the flowcharts. In such an embodiment, the computer program may be downloaded and installed from a network through the communication part 1209, and/or installed from the removable medium 1211. When the computer program is executed by the central processing unit 1201, the various functions defined in the system of this application are executed.

Figure 13:
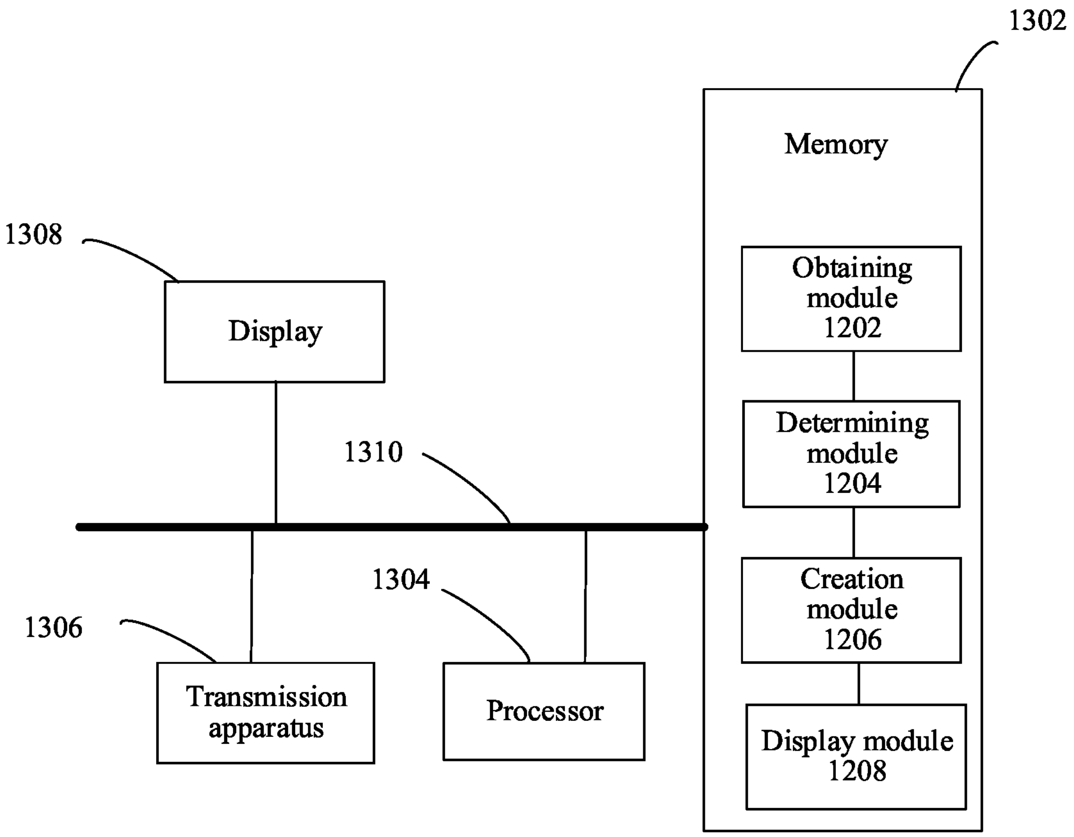
FIG. 13 is a schematic structural diagram of an electronic device according to an embodiment of this application.

According to still another aspect of the embodiments of this application, an electronic device for implement the foregoing virtual organization creation method is further provided. The electronic device may be the terminal device or the server shown in FIG. 1. In this embodiment, an example in which the electronic device is a server is used for description. As shown in FIG. 13, the electronic device includes a memory 1302 and a processor 1304, the memory 1302 stores a computer program, and the processor 1304 is configured to perform the steps in any one of the foregoing method embodiments through the computer program.

In this embodiment, the electronic device may be located in at least one of a plurality of network devices in a computer network.

In this embodiment, the processor may be configured to execute the computer program, to perform the following steps:

S1: acquiring an organization identifier of a target virtual organization to be created by a first game account;

S2: determining, in a preset virtual region set, a target virtual region matching a first IP address used by the first game account to log into the target game application, the target virtual region being a virtual region to which a country or an administrative region in which the first IP address is located is mapped;

S3: creating the target virtual organization located in the target virtual region in response to a creation instruction triggered by the first game account, the creation instruction being used for requesting to create the target virtual organization; and S4: displaying the organization identifier of the target virtual organization and attribute information of the target virtual region, the attribute information including a language used by a game account in the virtual organization created in the target virtual region.

A person of ordinary skill in the art may understand that the structure shown in FIG. 13 is only an example, and the electronic device may alternatively be a terminal device such as a smartphone (for example, an Android-based mobile phone or an iOS-based mobile phone), a tablet computer, a palmtop computer, a mobile Internet device (MID), or a pad. http://www.baidu.com/link?url=kZMWGJqjJ4zBBpC8yDF8xDh8vibi2FZpJmk_dYkPNNm6LYBwTHBb FIG. 13 does not constitute a limitation on a structure of the electronic device. For example, the electronic device may further include more or less components (for example, a network interface) than those shown in FIG. 13, or has a configuration different from that shown in FIG. 13.

The memory 1302 may be configured to store a software program and a module, for example, a program instruction/module corresponding to a method and apparatus in an embodiment of this application, and the processor 1304 performs various functional applications and data processing by running a software program and a module stored in the memory 1302, that is, implementing the foregoing virtual organization creation method. The memory 1302 may include a high-speed random memory, and may also include a nonvolatile memory, for example, one or more magnetic storage apparatuses, a flash memory, or another nonvolatile solid-state memory. In some embodiments, the memory 1302 may further include memories remotely disposed relative to the processor 1304, and the remote memories may be connected to a terminal through a network. Examples of the network include but are not limited to the Internet, an intranet, a local area network, a mobile communication network, and a combination thereof. Specifically, the memory 1302 may be specifically configured to store information such as sample characteristics of objects and target virtual resource accounts, but is not limited thereto. For example, as shown in FIG. 13, the memory 1302 may include, but is not limited to, the acquisition module 1202, the determining module 1204, the creation module 1206, and the display module 1208 in the foregoing virtual organization creation apparatus. In addition, the memory 1302 may alternatively include, but is not limited to, other modules or units in the foregoing virtual organization creation method. Details are not described in this example again.

In some embodiments, a transmission apparatus 1306 is configured to receive or send data through a network. Specific examples of the network include a wired network and a wireless network. In an example, the transmission apparatus 1306 includes a network interface controller (NIC). The NIC may be connected to another network device and a router by using a network cable, so as to communicate with the Internet or a local area network. In an example, the transmission apparatus 1306 is a radio frequency (RF) module, which communicates with the Internet in a wireless manner.

The electronic device further includes: a display 1308, configured to display the foregoing to-be-processed order information; and a connection bus 1310, configured to connect the modules and the components in the electronic device.

In another embodiment, the terminal device or the server may be a node in a distributed system. The distributed system may be a blockchain system, and the blockchain system may be a distributed system including a plurality of nodes that are connected through network communication. Nodes may constitute a peer-to-peer (P2P) network. Computing devices in any forms, for example, electronic devices such as servers and terminals, may join the peer-to-peer network to become nodes of the blockchain system.

According to an aspect of this application, a computer program product is provided. The computer program product includes a computer program/instructions, and the computer program/instructions include program code used for performing the methods shown in the flowcharts. In such an embodiment, the computer program may be downloaded and installed from a network through the communication part 1309, and/or installed from the removable medium 1311. When the computer program is executed by the central processing unit 1301, the various functions provided in the embodiments of this application are executed.

According to an aspect of this application, a computer-readable storage medium is provided. A processor of a computer device reads computer instructions from the computer-readable storage medium, and the processor executes the computer instructions, so that the computer device performs the virtual organization creation method provided in the foregoing implementations.

In this embodiment, the computer-readable storage medium may be configured to store a computer program used for performing the following steps:

S1: acquiring an organization identifier of a target virtual organization to be created by a first game account;

S2: determining, in a preset virtual region set, a target virtual region matching a first IP address used by the first game account to log into the target game application, the target virtual region being a virtual region to which a country or an administrative region in which the first IP address is located is mapped;

S3: creating the target virtual organization located in the target virtual region in response to a creation instruction triggered by the first game account, the creation instruction being used for requesting to create the target virtual organization; and S4: displaying the organization identifier of the target virtual organization and attribute information of the target virtual region, the attribute information including a language used by a game account in the virtual organization created in the target virtual region.

In this embodiment, a person of ordinary skill in the art can understand that, all or some steps in the methods in the foregoing embodiments may be performed by a program instructing related hardware of a terminal device. The program may be stored in a computer-readable storage medium. The storage medium may include: a flash drive, a read-only memory (ROM), a random access memory (RAM), a magnetic disk, an optical disc, or the like.

When the integrated unit in the foregoing embodiments is implemented in a form of a software functional unit and sold or used as an independent product, the integrated unit may be stored in the foregoing computer-readable storage medium. Based on such understanding, the technical solutions of this application essentially, or the part contributing to the prior art, or all or some of the technical solutions may be implemented in the form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are merely exemplary implementations of this application. A person of ordinary skill in the art may further make several improvements and modifications without departing from the principle of this application, and the improvements and modifications fall within the protection scope of this application.

What is claimed is:

1. A method for creating a virtual organization in a target game application, performed by an electronic device, and the method comprising:

acquiring an instruction for creating a target virtual organization, the instruction including an organization identifier of the target virtual organization corresponding to a first game account;

determining, in a preset virtual region set, a target virtual region matching a first IP address used by the first game account to log into the target game application, the target virtual region being a virtual region to which a country or an administrative region in which the first IP address is located is mapped;

creating the target virtual organization located in the target virtual region; and displaying the organization identifier of the target virtual organization and attribute information of the target virtual region, the attribute information comprising a language used by a game account in the virtual organization created in the target virtual region.

2. The method according to claim 1, wherein the acquiring an instruction for creating a target virtual organization, the instruction including an organization identifier of the target virtual organization corresponding to a first game account comprises:

displaying a creation interface in the target game application to which the first game account has logged in, the creation interface comprising an identifier input region for inputting the organization identifier of the target virtual organization; and acquiring the input organization identifier of the target virtual organization from the identifier input region on the creation interface.

3. The method according to claim 2, wherein the method further comprises:

displaying the attribute information of the target virtual region on the creation interface.

4. The method according to claim 1, wherein the displaying the organization identifier of the target virtual organization and attribute information of the target virtual region comprises:

displaying the first game account, the organization identifier of the target virtual organization, and the attribute information of the target virtual region;

marking the first game account as a creator of the target virtual organization;

setting the organization identifier of the target virtual organization and the attribute information of the target virtual region being to be visible to a game account in the target virtual region or visible to game accounts in one or more virtual regions in the virtual region set.

5. The method according to claim 1, wherein the method further comprises:

determining, in the virtual region set, a virtual region matching a second IP address used by a second game account to log into the target game application; and when the virtual region matching the second IP address is the target virtual region, displaying the identifier of the target virtual organization and the attribute information of the target virtual region in the target game application to which the second game account has logged in.

6. The method according to claim 1, wherein the method further comprises:

determining, in the virtual region set, a virtual region matching a third IP address used by a third game account to log into the target game application; and when the virtual region matching the third IP address is not the target virtual region and the organization identifier of the target virtual organization and the attribute information of the target virtual region are set to be visible to a game account in the virtual region matching the third IP address, displaying the identifier of the target virtual organization and the attribute information of the target virtual region in the target game application to which the third game account has logged in.

7. The method according to claim 1, wherein the determining, in a preset virtual region set, a target virtual region matching a first IP address used by the first game account to log into the target game application comprises:

determining a target login location of the first game account based on the first IP address used by the first game account to log in to the target game application; and determining, in the virtual region set, the target virtual region corresponding to the target login location based on a correspondence between each virtual region in the virtual region set and one or more login locations.

8. An electronic device, comprising a memory and a processor, the memory storing a computer program that, when executed by the processor, causes the electronic device to perform a method for creating a virtual organization in a target game application, the method including:

acquiring an instruction for creating a target virtual organization, the instruction including an organization identifier of the target virtual organization corresponding to a first game account;

determining, in a preset virtual region set, a target virtual region matching a first IP address used by the first game account to log into the target game application, the target virtual region being a virtual region to which a country or an administrative region in which the first IP address is located is mapped;

creating the target virtual organization located in the target virtual region; and displaying the organization identifier of the target virtual organization and attribute information of the target virtual region, the attribute information comprising a language used by a game account in the virtual organization created in the target virtual region.

9. The electronic device according to claim 8, wherein the acquiring an instruction for creating a target virtual organization, the instruction including an organization identifier of the target virtual organization corresponding to a first game account comprises:

displaying a creation interface in the target game application to which the first game account has logged in, the creation interface comprising an identifier input region for inputting the organization identifier of the target virtual organization; and acquiring the input organization identifier of the target virtual organization from the identifier input region on the creation interface.

10. The electronic device according to claim 9, wherein the method further comprises:

displaying the attribute information of the target virtual region on the creation interface.

11. The electronic device according to claim 8, wherein the displaying the organization identifier of the target virtual organization and attribute information of the target virtual region comprises:

displaying the first game account, the organization identifier of the target virtual organization, and the attribute information of the target virtual region;

marking the first game account as a creator of the target virtual organization;

setting the organization identifier of the target virtual organization and the attribute information of the target virtual region being to be visible to a game account in the target virtual region or visible to game accounts in one or more virtual regions in the virtual region set.

12. The electronic device according to claim 8, wherein the method further comprises:

determining, in the virtual region set, a virtual region matching a second IP address used by a second game account to log into the target game application; and when the virtual region matching the second IP address is the target virtual region, displaying the identifier of the target virtual organization and the attribute information of the target virtual region in the target game application to which the second game account has logged in.

13. The electronic device according to claim 8, wherein the method further comprises:

determining, in the virtual region set, a virtual region matching a third IP address used by a third game account to log into the target game application; and when the virtual region matching the third IP address is not the target virtual region and the organization identifier of the target virtual organization and the attribute information of the target virtual region are set to be visible to a game account in the virtual region matching the third IP address, displaying the identifier of the target virtual organization and the attribute information of the target virtual region in the target game application to which the third game account has logged in.

14. The electronic device according to claim 8, wherein the determining, in a preset virtual region set, a target virtual region matching a first IP address used by the first game account to log into the target game application comprises:

determining a target login location of the first game account based on the first IP address used by the first game account to log in to the target game application; and determining, in the virtual region set, the target virtual region corresponding to the target login location based on a correspondence between each virtual region in the virtual region set and one or more login locations.

15. A non-transitory computer-readable storage medium storing a computer program that, when executed by a processor of a computer device, causes the electronic device to perform a method for creating a virtual organization in a target game application, the method including:

acquiring an instruction for creating a target virtual organization, the instruction including an organization identifier of the target virtual organization corresponding to a first game account;

determining, in a preset virtual region set, a target virtual region matching a first IP address used by the first game account to log into the target game application, the target virtual region being a virtual region to which a country or an administrative region in which the first IP address is located is mapped;

creating the target virtual organization located in the target virtual region; and displaying the organization identifier of the target virtual organization and attribute information of the target virtual region, the attribute information comprising a language used by a game account in the virtual organization created in the target virtual region.

16. The non-transitory computer-readable storage medium according to claim 15, wherein the acquiring an instruction for creating a target virtual organization, the instruction including an organization identifier of the target virtual organization corresponding to a first game account comprises:

displaying a creation interface in the target game application to which the first game account has logged in, the creation interface comprising an identifier input region for inputting the organization identifier of the target virtual organization; and acquiring the input organization identifier of the target virtual organization from the identifier input region on the creation interface.

17. The non-transitory computer-readable storage medium according to claim 15, wherein the displaying the organization identifier of the target virtual organization and attribute information of the target virtual region comprises:

displaying the first game account, the organization identifier of the target virtual organization, and the attribute information of the target virtual region;

marking the first game account as a creator of the target virtual organization;

setting the organization identifier of the target virtual organization and the attribute information of the target virtual region being to be visible to a game account in the target virtual region or visible to game accounts in one or more virtual regions in the virtual region set.

18. The non-transitory computer-readable storage medium according to claim 15, wherein the method further comprises:

determining, in the virtual region set, a virtual region matching a second IP address used by a second game account to log into the target game application; and when the virtual region matching the second IP address is the target virtual region, displaying the identifier of the target virtual organization and the attribute information of the target virtual region in the target game application to which the second game account has logged in.

19. The non-transitory computer-readable storage medium according to claim 15, wherein the method further comprises:

determining, in the virtual region set, a virtual region matching a third IP address used by a third game account to log into the target game application; and when the virtual region matching the third IP address is not the target virtual region and the organization identifier of the target virtual organization and the attribute information of the target virtual region are set to be visible to a game account in the virtual region matching the third IP address, displaying the identifier of the target virtual organization and the attribute information of the target virtual region in the target game application to which the third game account has logged in.

20. The non-transitory computer-readable storage medium according to claim 15, wherein the determining, in a preset virtual region set, a target virtual region matching a first IP address used by the first game account to log into the target game application comprises:

determining a target login location of the first game account based on the first IP address used by the first game account to log in to the target game application; and determining, in the virtual region set, the target virtual region corresponding to the target login location based on a correspondence between each virtual region in the virtual region set and one or more login locations.

* * * * *